Jan. 17, 1928.

C. E. JEFFERS 1,656,521

TIRE CARRIER

Filed Feb. 9, 1927

INVENTOR.
*Clarence E. Jeffers*
BY *Bacon & Thomas*
ATTORNEYS

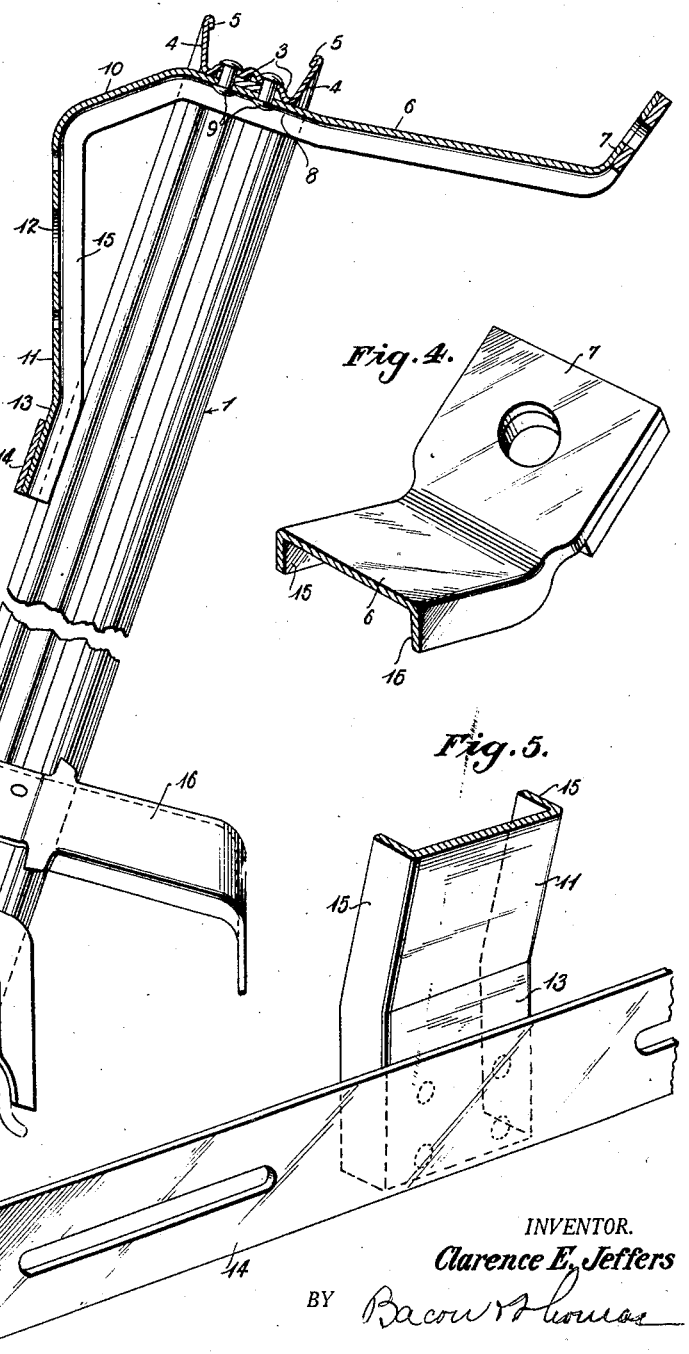

Patented Jan. 17, 1928.

1,656,521

UNITED STATES PATENT OFFICE.

CLARENCE E. JEFFERS, OF YORK, PENNSYLVANIA, ASSIGNOR TO MARTIN-PARRY CORPORATION, OF YORK, PENNSYLVANIA, A CORPORATION OF DELAWARE.

TIRE CARRIER.

Application filed February 9, 1927. Serial No. 166,923.

The invention relates to improvements in tire carriers, and appertains more particularly to a tire carrier of the ring type.

It is an object of this invention to provide an improved form of bracket serving to aid in the support of the tire carrier, and to also support a light and license plate in the open interior of the ring.

This construction permits a single bracket to be utilized in aiding in the support of the carrier on the vehicle chassis, as well as supporting the license tag and the like in the proper position relative to the ring.

In the accompanying drawings I have shown a preferred embodiment of the invention in which Figure 1 illustrates a view of a tire carrier with the bracket; and, Figure 2 is a sectional view on line 2—2 of Figure 1.

Fig. 3 is a sectional view taken on line 3—3 of Fig. 1.

Fig. 4 is a detailed view of the channel shaped formation of the bracket 6, and

Fig. 5 is a detailed view partly in section of the manner of supporting the license bracket.

Figure 1:
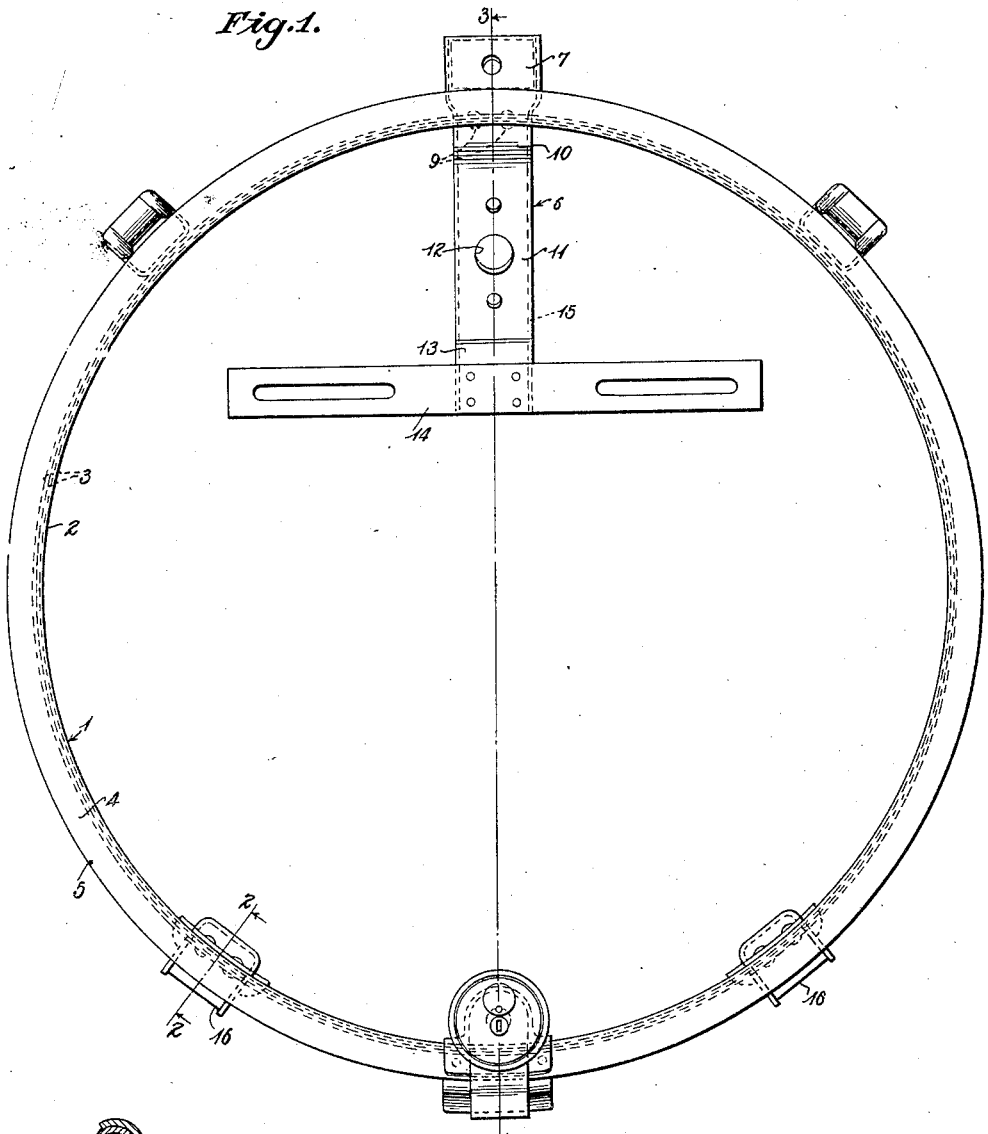
Figure 2:
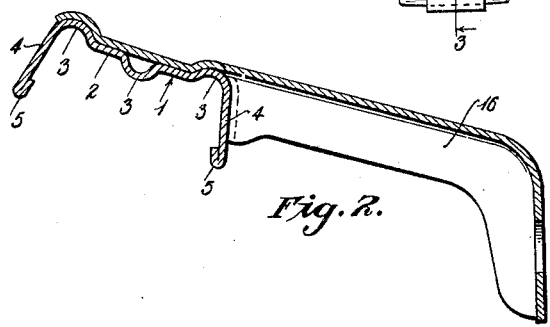

Referring now more particularly to the drawings wherein like reference characters indicate corresponding parts, the numeral 1 designates a ring of the tire carrier. The specific construction of this ring forms no part of my invention as my invention is applicable for use in connection with this special structure, or a ring of any other construction. As shown, however, the ring embodies a base 2 having a plurality of circumferential reinforcing corrugations 3. The flanges 4 of the ring are provided with rebent ends 5 for the purpose of reinforcing the flanges of the channel or U-shaped ring.

To support this ring to a tire carrier an upper or main support is needed. In this application said support embodies a bracket 6. This bracket has an upturned end portion 7 by means of which it is secured to a vehicle. The bracket also has a slightly inclined extension 8, the outer end of which is riveted by the rivets 9 to the ring 1 of the carrier. In lieu of rivets the bracket could be welded if this is desirable. In the embodiment of the invention herein shown, the ring carrier is inclined slightly to the vehicle. The bracket beyond the ring carrier has an intermediate portion 10 of a substantially V-shaped contour. The downwardly and inwardly directed portion 11 of this bracket is provided with an opening 12 by means of which a tail light is attached to the bracket. The lower end of the bracket is then bent and extends parallel with the ring 1 forming a section 13 to which the license carrying plate 14 is riveted or otherwise secured. The license carrying plate receives any well known license tag which is suspended in the open interior of the ring below the light positioned on the bracket.

As will be observed, the bracket is preferably made from a cold rolled strip of metal and has inwardly turned side flanges 15 extending substantially throughout its length for the purpose of reinforcing this bracket, so that it is capable of sustaining the load placed thereon and also serves to support the light and tag without permitting any substantial vibration thereof.

The ring also has a pair of attaching lugs or brackets 16 attached to the lower portion thereof by rivets or the like, which assist in supporting the carrier on the vehicle. Any suitable form of attaching lug or support can be used, although these parts are preferably made from stamped or cold rolled metal. Likewise, to lock a spare tire on the rim any approved form of locking assembly can be used, and inasmuch as this invention has no reference to the construction of the locking assembly, none need be here shown.

Having thus described my invention, what I claim is:

A tire carrier for automobiles comprising a ring for receiving and supporting a demountable rim and tire, brackets for supporting said ring to the automobile body in an inclined position with respect to the body, one of said brackets being rigidly secured to the upper portion of the ring intermediate the ends of the bracket and having a rearwardly and upwardly extending arm secured to the vehicle to assist in supporting said ring in its inclined position, an outwardly and thence inwardly and downwardly extending extension of said bracket terminating in the interior of said ring, said extension having a recess adapted to receive a tail light and to receive a license tag at its terminal end at a point substantially within the confines of the ring.

In testimony whereof I affix my signature.

CLARENCE E. JEFFERS.